(12) United States Patent
Hashimoto

(10) Patent No.: US 9,501,121 B2
(45) Date of Patent: Nov. 22, 2016

(54) JOB PROCESSING APPARATUS USING MULTIPLE POWER SOURCES AND METHOD OF CONTROLLING THE SAME

(71) Applicant: CANON KABUSHIKI KAISHA, Tokyo (JP)

(72) Inventor: Minoru Hashimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 14/098,348

(22) Filed: Dec. 5, 2013

(65) Prior Publication Data

US 2014/0163701 A1 Jun. 12, 2014

(30) Foreign Application Priority Data

Dec. 7, 2012 (JP) ................................. 2012-267894

(51) Int. Cl.
*G06F 1/26* (2006.01)
*G05B 13/02* (2006.01)
(Continued)

(52) U.S. Cl.
CPC ............... *G06F 1/263* (2013.01); *G05B 13/02* (2013.01); *G06F 1/3206* (2013.01);
(Continued)

(58) Field of Classification Search
CPC ............ H04N 1/00901; H04N 1/00904; H04N 1/00954; H04N 2201/0094; G03G 15/80; G03G 2215/00126; G03G 2215/00983; G06K 15/4055; G06K 15/1823; G06F 1/263; G06F 1/3206;
(Continued)

(56) References Cited

U.S. PATENT DOCUMENTS 8,657,277 B2 * 2/2014 Satsukawa .............. B42B 5/103
270/58.07
9,041,950 B2 * 5/2015 Nakamura ........... G06K 15/409
358/1.13
(Continued)

FOREIGN PATENT DOCUMENTS

CN 101001026 A 7/2007
JP 5-122855 A 5/1993
(Continued)

*Primary Examiner* — Crystal J Barnes-Bullock
(74) *Attorney, Agent, or Firm* — Canon USA, Inc. IP Division

(57) ABSTRACT

A job processing apparatus that performs job processing by using power supplied from a first power supply and a second power supply includes a receiving unit that receives a job; a calculating unit that calculates an amount of power consumed to process the received job; a determining unit that determines whether the received job is executable with a first amount of power that can be supplied from the first power supply and the calculated amount of power; and a control unit that performs control so that the job is processed with the power supplied from the first power supply if the determining unit determines that the job is executable with the first amount of power and the job is processed with the power supplied from the second power supply if the determining unit determines that the job is not executable with the first amount of power.

18 Claims, 11 Drawing Sheets

(51) Int. Cl.
*G06F 1/32* (2006.01)
*G06K 15/02* (2006.01)
*H04N 1/00* (2006.01)

(52) U.S. Cl.
CPC ...... *G06K 15/1823* (2013.01); *H04N 1/00901* (2013.01); *H04N 1/00904* (2013.01); *Y02B 60/1271* (2013.01)

(58) Field of Classification Search
CPC .................. G06F 1/66; Y02B 60/1267; Y02B 60/32
See application file for complete search history.

(56) References Cited

U.S. PATENT DOCUMENTS

2006/0244422 A1* 11/2006 DiGiovanna ......... G06F 1/3203
320/137
2012/0026524 A1 2/2012 Sekido et al.
2012/0272077 A1* 10/2012 Dow ..................... G06F 1/1698
713/310
2014/0136009 A1* 5/2014 Imaizumi ........... H04N 1/00896
700/295

FOREIGN PATENT DOCUMENTS

JP 2009162902 A * 7/2009
JP 2013113874 A * 6/2013

\* cited by examiner

FIG. 6

| 601 | 602 |
|---|---|
| NO JOB PROCESSING | 10 W |
| COPY JOB | 1400 W |
| PRINT JOB | 1300 W |
| SCAN JOB | 100 W |

FIG. 7

| 701 | 702 | 703 | 704 |
|---|---|---|---|
| TRANSMISSION SOURCE | TRANSMISSION DESTINATION | CONTENT OF COMMAND | POWER TYPE |
| 1 | 2 | REQUEST FOR VALUE OF AVAILABLE POWER | GREEN POWER |

FIG. 8

| 801 | 802 | 803 | 804 |
|---|---|---|---|
| TRANSMISSION SOURCE | TRANSMISSION DESTINATION | CONTENT OF COMMAND | POWER TYPE |
| 1 | 2 | SPECIFICATION OF POWER SUPPLY THAT IS USED | GREEN POWER |

FIG. 13

| 1301 | 1302 | 1303 |
|---|---|---|
| TRANSMISSION SOURCE | TRANSMISSION DESTINATION | CONTENT OF COMMAND |
| 1 | 2 | REQUEST FOR INFORMATION ABOUT SELECTED POWER SUPPLY |

FIG. 14

| 1401 | 1402 | 1403 | 1404 |
|---|---|---|---|
| SERIAL NUMBER | JOB TYPE | TIME | POWER SUPPLY TYPE |
| 1 | COPY | APRIL 01, 2012, 08:45 | COMMERCIAL POWER SUPPLY |
| 2 | PRINT | APRIL 01, 2012, 10:02 | GREEN POWER |
| 3 | FAX | APRIL 01, 2012, 13:24 | GREEN POWER |
| 4 | PRINT | APRIL 01, 2012, 18:02 | COMMERCIAL POWER SUPPLY |

JOB PROCESSING APPARATUS USING MULTIPLE POWER SOURCES AND METHOD OF CONTROLLING THE SAME

BACKGROUND OF THE INVENTION

1. Field of the Invention

The present invention relates to a job processing apparatus that performs job processing by using multiple electric power resources and a method of controlling the job processing apparatus.

2. Description of the Related Art

Apparatuses, such as electrophotographic multifunction peripherals (MFPs), printers, and facsimiles (FAXs), which require heat for image formation have hitherto required a large amount power in the image formation. In particular, a larger amount of power is consumed in fixing heaters and image data processing. In contrast, environments capable of using renewable energy generated by, for example, solar power generation or wind power generation are in widespread use as a recent approach to increase in energy saving consciousness and reduction in greenhouse gas emissions. The renewable energy generated by, for example, the solar power generation and the wind power generation is called green power.

However, the amount of power generation with the green power depends on the natural environment and the green power is not necessarily usable in apparatuses, such as the MFPs, which consume a large amount of power. For example, this applies to a case in which the amount of power consumption exceeds the power that can be supplied by the green power. In order to resolve this problem, technologies to automatically switch between the green power and commercial power supply and technologies to control the mixing ratio between the green power and the commercial power supply are known (for example, refer to Japanese Patent Laid-Open No. 5-122855). In addition, since the power that can be supplied by the green power is varied with time and a difference may occur between the power required by the apparatus and the power that can be supplied by the green power, rechargeable secondary batteries are often used. Specifically, a configuration is used in which the secondary battery is charged with the power generated by the green power and the power used by the apparatus is selected from the secondary battery and the commercial power supply or the power resulting from mixture of the power generated by the secondary battery with the commercial power supply is used for the apparatus to supply the power that is selected or mixed to the apparatus.

A user instructs the MFP to perform any of a copy operation, a print operation, a scanning operation, and a facsimile (FAX) transmission operation as one job and the MFP processes the instructed job. In a FAX reception operation, a job is transmitted by facsimile from another FAX transmission apparatus to the MFP via a telephone line or a network and the MFP processes the transmitted job as one FAX reception job.

A typical MFP that processes such jobs is featured in that a large amount of power is required in the execution of a job while a small amount of power is used in a standby mode. In addition, different amounts of power are required for different jobs. Accordingly, also when the green power is used to execute a job, the green power may not be used depending on the amount of power generated with the green power and the type of the job. In configurations using the secondary batteries for the green power, there are cases in which the amount of power resulting from addition of the amount of power accumulated in the secondary batteries to the power that is generated during the execution of jobs is insufficient for the amount of power necessary for the execution of the jobs. When the amounts of power is insufficient for the execution of the jobs, the power is supplied from the commercial power supply, as in the case disclosed in Japanese Patent Laid-Open No. 5-122855.

The MFP is also featured in that multiple users are capable of using the MFP via a network. Accordingly, jobs that have been executed may be counted for every user or for every group to which each user belongs for charge. The environment in which the green power is introduced has a challenge in that the jobs are separately counted depending on whether the green power is used or the commercial power supply is used to reflect the result of the counting in the charge. Specifically, since the availability of the green power is increased during periods of time when the amount of power generation with the green power is large and during periods of time when the MFP is less used, lower rates are charged during such periods of time. This allows the use of the green power to be promoted.

SUMMARY OF THE INVENTION

The present invention provides a mechanism capable of switching the power supply source depending on the content of a job that is received.

According to an embodiment of the present invention, a job processing apparatus that performs job processing by using power supplied from a first power supply and a second power supply includes a receiving unit, a calculating unit, a determining unit, and a control unit. The receiving unit receives a job. The calculating unit calculates an amount of power consumed to process the received job. The determining unit determines whether the received job is executable with a first amount of power that can be supplied from the first power supply and the calculated amount of power. The control unit performs control so that the job is processed with the power supplied from the first power supply if the determining unit determines that the job is executable with the first amount of power and the job is processed with the power supplied from the second power supply if the determining unit determines that the job is not executable with the first amount of power.

According to the present invention, it is possible to switch the power supply source depending on the content of a job that is received.

Further features of the present invention will become apparent from the following description of exemplary embodiments with reference to the attached drawings.

BRIEF DESCRIPTION OF THE DRAWINGS

FIG. 6 illustrates an exemplary amount-of-power table for every job.

FIG. 7 illustrates an exemplary command to inquire about available green power.

FIG. 8 illustrates an exemplary command to specify a power supply that is to be used for the power mixing unit.

FIG. 13 illustrates an exemplary command managed by a CPU.

FIG. 14 illustrates an exemplary history table of power supply types that are selected in association with jobs.

DESCRIPTION OF THE EMBODIMENTS

Embodiments of the present invention will herein be described with reference to the attached drawings.

First Embodiment

Figure 1:
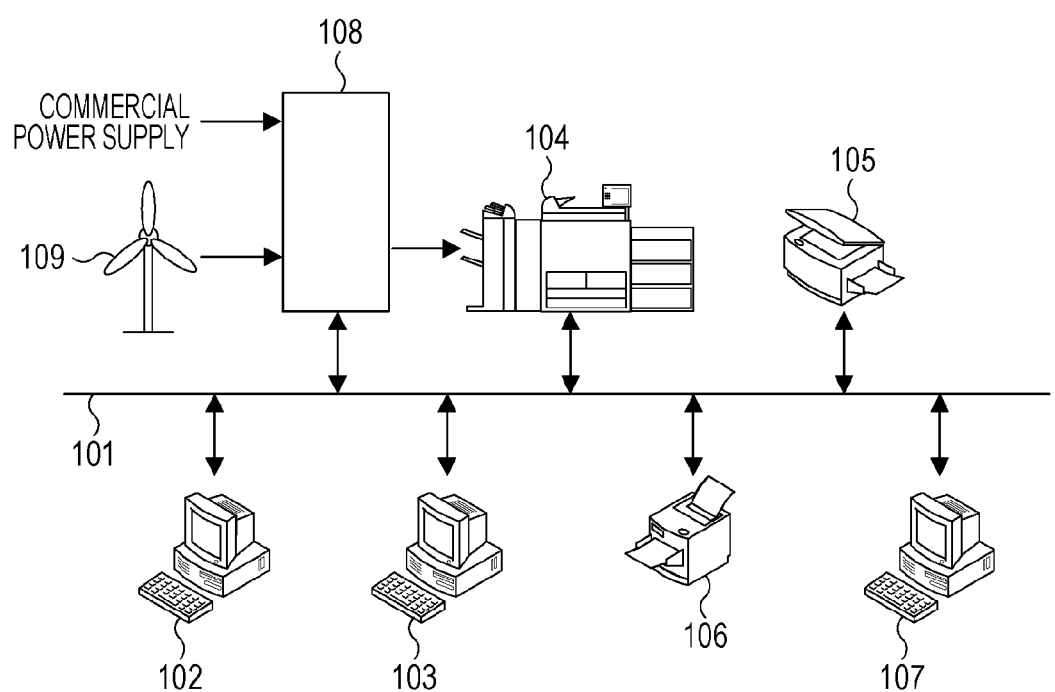
FIG. 1 illustrates an exemplary configuration of a job processing system to which a job processing apparatus according to a first embodiment is applicable.

FIG. 1 illustrates an exemplary configuration of a job processing system to which a job processing apparatus according to a first embodiment is applicable. In the job processing system in the example in FIG. 1, the power supply source is appropriately switched between the commercial power supply and, for example, a clean energy source (a source of the green power generated by a power generation system, such as a wind power generation system or a solar power panel) depending on the content of a job to be processed by an MFP, which is an example of the job processing apparatus.

Referring to FIG. 1, MFPs 104 and 105, a printer 106, a FAX 107, and so on are connected to a network 101. The network 101 is the Ethernet (registered trademark) in the example in FIG. 1. Since the embodiments of the present invention do not depend on the network system, another network system is applicable.

Personal computers (PCs) 102 and 103 are used by users and are capable of transmitting and receiving data to and from apparatuses including the MFPs 104 and 105, the printer 106, and the FAX 107. A power mixing unit 108 switches between the commercial power supply and a power generating unit 109 that generates the green power as the renewable energy to supply the power from the commercial power supply or the power generating unit 109 to the MFP 104. The MFP 104 is capable of communicating with the power mixing unit 108 via the network 101 and is capable of acquiring information about the state of the power generating unit 109 from the power mixing unit 108. The MFP 104 is capable of instructing the power mixing unit 108 to perform the switching. In the embodiments, a second power supply is the commercial power supply and a first power supply is the power generating unit 109, which is different in type from the second power supply.

Each of the MFPs 104 and 105 is a device in which a copy function, a printer function, a scanner function, and so on are integrated with each other. Such devices are varied in the presence of a color print support and the print speed and are also greatly varied in the power consumption. In particular, a larger amount of power is required in the heaters in electrophotographic printers in which toner is thermally fixed. The power consumption in color printers is generally greater than that in monochrome printers and the power consumption is increased with the increasing print speed.

In addition, since the power consumption in components other than the operating components can be cut in the MFP, the maximum value of the power consumption is greatly varied with the job type.

Specifically, in the copy operation, the amount of power consumption is, for example, up to 1,400 W because both the scanner function and the printer function are used. In the scanner operation, the amount of power consumption is, for example, up to about 100 W because the power of the component used in the print operation is turned off. In the print operation, the amount of power consumption is, for example, 1,300 W because the power supply for the scanner is turned off. When no job is being processed, the power is mainly consumed in display in an operation panel and the amount of power consumption is, for example, about 10 W. The printer 106 and the FAX 107 are single function apparatuses in the job processing system in FIG. 1.

The configuration and the operation of the MFP 104 will now be described. Although the embodiments of the present invention are also applicable to the MFP 105, the MFP 104 is exemplified for simplicity.

Figure 2:
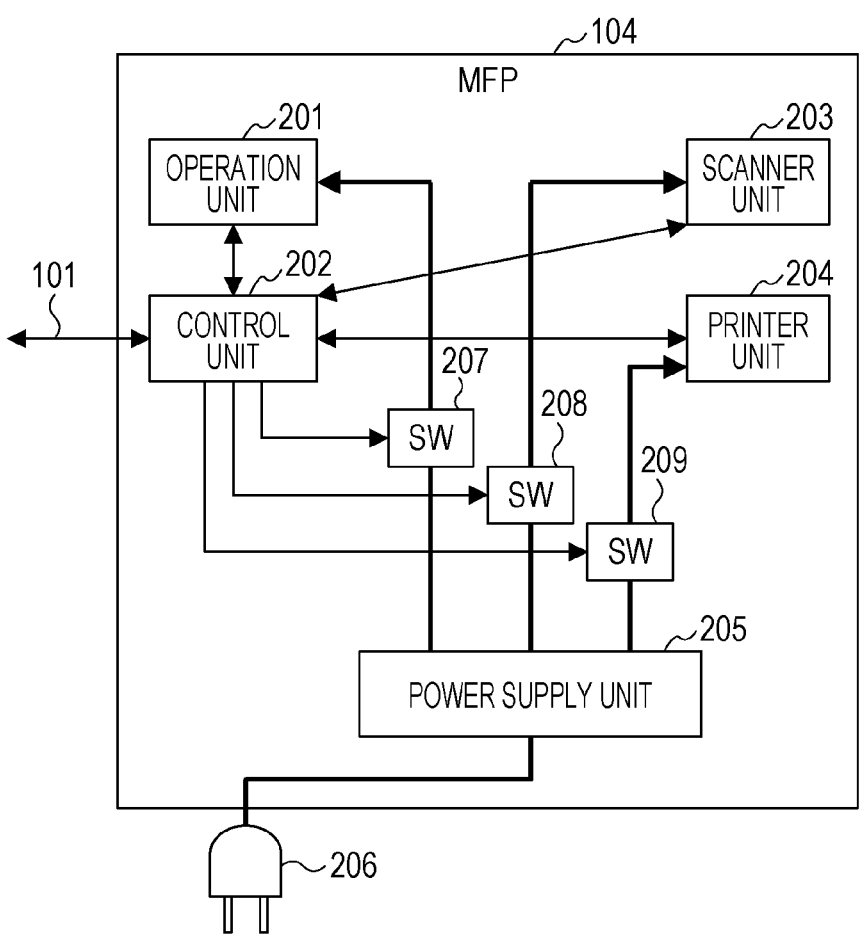
FIG. 2 is a block diagram illustrating an exemplary internal configuration of an MFP illustrated in FIG. 1.

FIG. 2 is a block diagram illustrating an exemplary internal configuration of the MFP 104 illustrated in FIG. 1.

Referring to FIG. 2, a control unit 202 controls the operation of the MFP 104 and performs transmission and reception of data, conversion of data, storage of data, and control of the power mixing unit 108. When the MFP 104 performs the print operation, print job data is generated by the PC 102 or the PC 103, is transferred to the control unit 202 through the network 101, and is temporarily stored in the control unit 202. The control unit 202 converts the print job data that is stored into image data and transfers the image data to a printer unit 204. The printer unit 204 prints the image data on a recording sheet of paper under the control of the control unit 202 and discharges the recording sheet of paper from the MFP 104.

When the MFP 104 performs the scanning operation, the user sets a document in a scanner unit 203 and operates a button while referring to the screen in an operation unit 201 to set the scanning operation and, then, instructs start of the scanning operation. The scanner unit 203 optically scans the document under the control of the control unit 202 to convert the document that is optically scanned into image data. The image data is temporarily stored in the control unit 202. If the image data is required by the control unit 202, the control unit 202 converts the data format of the image data to transfer the image data subjected to the conversion of the data format to a transmission destination specified in advance with the operation unit 201.

When the MFP 104 performs the copy operation, the user sets a document in the scanner unit 203 and operates a button while referring to the screen in the operation unit 201 to set the copy operation and, then, instructs start of the copy operation. The scanner unit 203 optically scans the document under the control of the control unit 202 to convert the document that is optically scanned into image data. After the image data is temporarily stored in the control unit 202, the control unit 202 converts the data format of the image data. The printer unit 204 prints the image data on a recording sheet of paper and discharges the recording sheet of paper from the MFP 104.

A power supply unit 205 converts alternating current power that is supplied from the power mixing unit 108 and that is input into the MFP 104 via a power plug 206 into direct current voltage used in each component in the MFP 104.

Switches 207, 208, and 209 are each used to turn off and on the power supply to the corresponding components on the basis of a signal supplied from the control unit 202.

When the MFP 104 processes no job, that is, when the MFP 104 is in the standby mode, the switches 207, 208, and 209 are disconnected under the control of a CPU 302 in the control unit 202. The switch 208 is used to turn off and on the power supply to the scanner unit 203. The switch 208 is turned on in a copy job and a scanning job, which use the scanner unit 203, and is turned off in the other jobs. The switch 209 is used to turn off and on the power supply to the printer unit 204. The switch 209 is turned on in the copy job and a print job, which use the printer unit 204, and is turned off in the other jobs.

Figure 3:
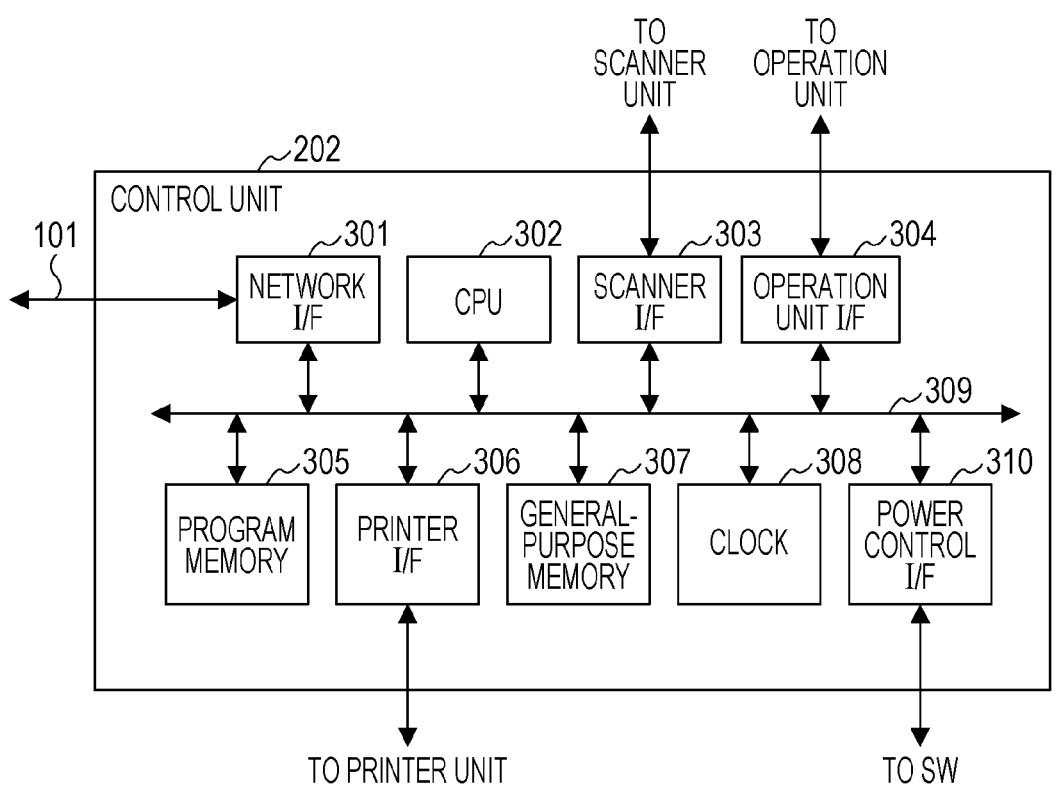
FIG. 3 is a block diagram illustrating an exemplary configuration of a control unit in the MFP illustrated in FIG. 2.

FIG. 3 is a block diagram illustrating an exemplary configuration of the control unit 202 in the MFP 104 illustrated in FIG. 2. Referring to FIG. 3, the CPU 302 controlling the control unit 202 executes a program stored in a program memory 305, which is a non-volatile memory, and uses a general-purpose memory 307 as a temporary storage area to perform processing. In addition to the CPU 302, the program memory 305, and the general-purpose memory 307, a network interface (I/F) 301 performing network communication, a scanner I/F 303 communicating with the scanner unit 203, a printer I/F 306 communicating with the printer unit 204, an operation unit I/F 304 communicating with the operation unit 201, and a clock 308 are connected to each other via an internal bus 309. The clock 308 is periodically corrected according to a network time protocol (NTP) via the network 101 in order to keep the precision. A power control I/F 310 is an output port through which a control signal is transmitted to the switches 207, 208, and 209 under the control of the CPU 302. The MFP 104 has the above configuration and operates in the above manner.

Figure 4:
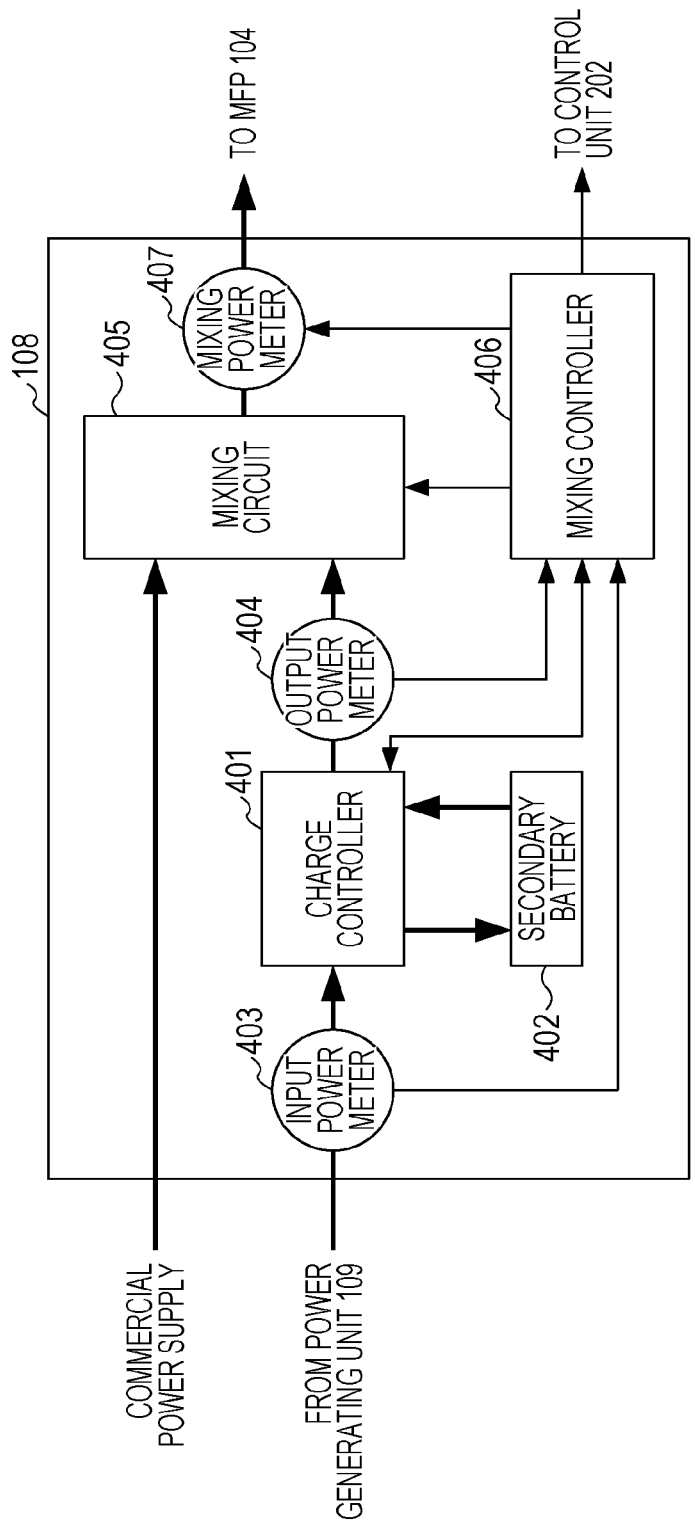
FIG. 4 is a block diagram illustrating an exemplary internal configuration of a power mixing unit illustrated in FIG. 1.

FIG. 4 is a block diagram illustrating an exemplary internal configuration of the power mixing unit 108 illustrated in FIG. 1.

Referring to FIG. 4, a secondary battery 402 is charged with the power supplied from the power generating unit 109 via a charge controller 401. Power discharged from the secondary battery 402 is supplied to a mixing circuit 405 through the charge controller 401 (the mixing circuit 405 will be described below). Since the power generated by the wind power generation and the solar power generation, which is the green power, is varied with wind power and sunshine, respectively, the use of the secondary battery 402 allows the supplied power to be stabilized. The charge controller 401 performs three operations: (1) an operation to charge the secondary battery 402, (2) an operation to discharge to the secondary battery 402, and (3) a bypass operation to output the input without using the secondary battery 402.

In the charge operation, the charge controller 401 converts alternating current power supplied from the power generating unit 109 into direct current voltage appropriate for the charge of the secondary battery 402 and controls the direct current voltage so as not to exceed the current value appropriate for the charge of the secondary battery 402. In the discharge operation, the charge controller 401 converts direct current power of the secondary battery 402 into alternating current power having a voltage appropriate for the mixing circuit 405. The charge controller 401 monitors the amount of power accumulated in the secondary battery 402 and stops the charge if the amount of power exceeds a certain value. When the charge is stopped, the charge controller 401 performs the bypass operation. In the bypass operation, the charge controller 401 converts the alternating current power supplied from the power generating unit 109 into the alternating current power having the voltage appropriate for the mixing circuit 405. The charge controller 401 may concurrently perform the charge operation and the bypass operation.

If the power supplied from the power generating unit 109 to the charge controller 401 is greater than the power with which the secondary battery 402 is charged, surplus power is bypassed to be supplied to the mixing circuit 405. The charge controller 401 may concurrently perform the discharge operation and the bypass operation. The power discharged from the secondary battery 402 is mixed with the power supplied from the power generating unit 109 in the charge controller 401 and the power resulting from the mixture is supplied to the mixing circuit 405.

The power output from the charge controller 401 and the commercial power supply is input into the mixing circuit 405. In the charge operation, the mixing circuit 405 mixes the power output from the charge controller 401 with the power of the commercial power supply at a ratio specified by a mixing controller 406 to output the power resulting from the mixture. For example, when the mixture ratio is 70%, the power of 70% is supplied from the charge controller 401 and the power of 30% is supplied from the commercial power supply. The output from the mixing circuit 405 is supplied to the MFP 104. The mixture ratio is varied because, if the power appropriate for the amount of power accumulated in the secondary battery 402 and the power generated by the power generating unit 109 is to be output and the above power is smaller than the power consumed in the MFP 104, it is necessary to replenish the shortage with the power from the commercial power supply.

The mixing controller 406 controls the charge controller 401 and the mixing circuit 405 and collects information in accordance with an instruction from the control unit 202. In the communication with the control unit 202, an instruction to perform an operation and a request for status information are issued from the control unit 202 to the power mixing unit 108. The operation instruction is, for example, an instruction to permit or not to permit the charge or the discharge of the secondary battery 402 or an instruction about the mixture ratio in the mixing circuit 405. The status information is, for example, the amount of power accumulated in the secondary battery 402, the states of the charge and the discharge in the secondary battery 402, the operation state of the mixing circuit 405, and the value of the power of each component. An input power meter 403 indicates power supplied from the power generating unit 109 to the charge controller 401. An output power meter 404 indicates power supplied from the charge controller 401 to the mixing circuit 405. A mixing power meter 407 indicates power output from the mixing circuit 405.

Figure 5:
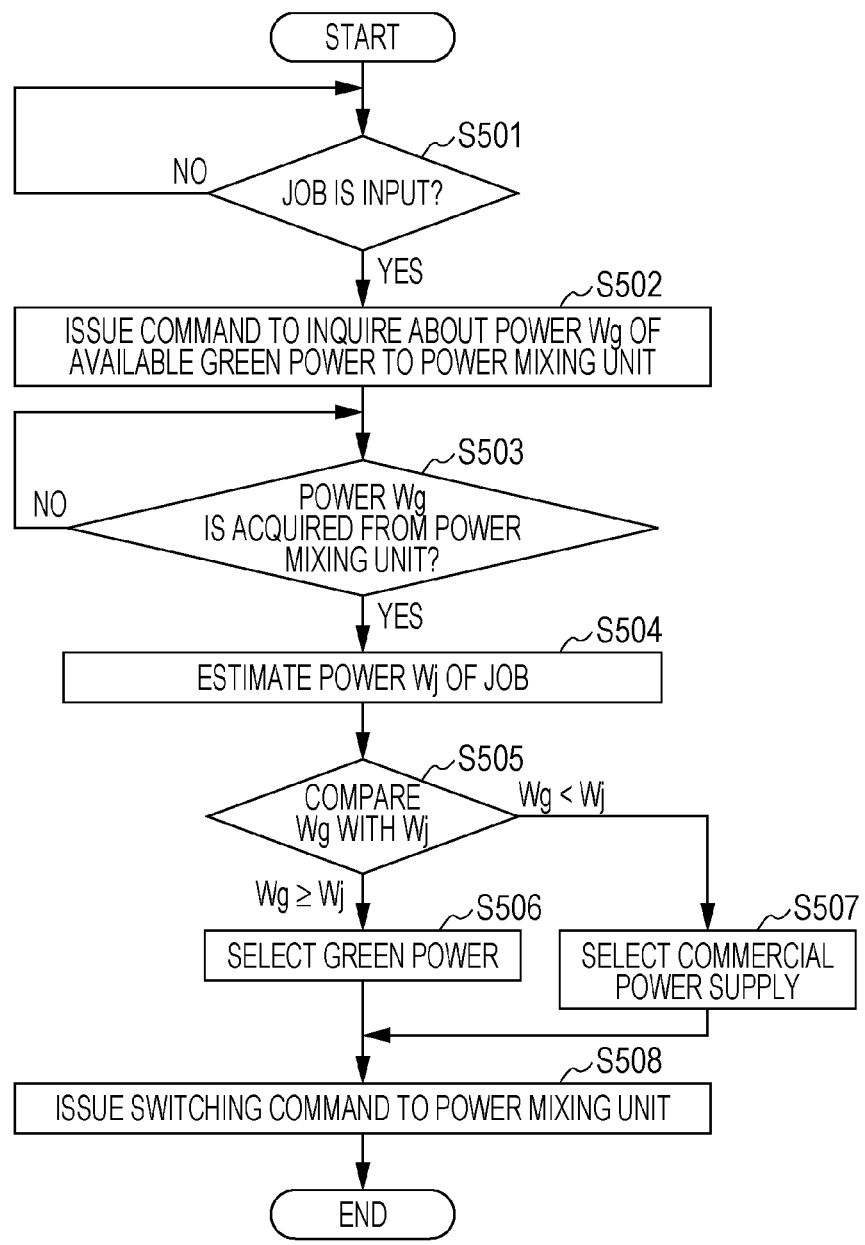
FIG. 5 is a flowchart illustrating a method of controlling the job processing apparatus according to the first embodiment.

FIG. 5 is a flowchart illustrating a method of controlling the job processing apparatus according to the first embodiment. An exemplary process performed by the CPU 302 in the control unit 202 when a job is input into the MFP 104 illustrated in FIG. 1 is illustrated in FIG. 5. Each step in the flowchart in FIG. 5 is realized by the CPU 302 that executes a control program stored in the program memory 305. In the example in FIG. 5, the switching of the power supply source is performed so that the first power supply is selected as the power supply source if the CPU 302 determines that the job is executable with a first amount of power and the second power supply is selected as the power supply source if the CPU 302 determines that the job is not executable with the first amount of power.

Referring to FIG. 5, in Step S501, the control unit 202 waits for input of a job. If a job is input, in Step S502, the CPU 302 transmits a command to inquire about power Wg of the available green power to the power mixing unit 108. The command will be described in detail below.

In Step S503, the CPU 302 waits for a response from the power mixing unit 108 and determines whether the power Wg that is inquired about is acquired from the power mixing unit 108. If the power Wg is acquired from the power mixing unit 108 (YES in Step S503), in Step S504, the CPU 302 estimates power Wj necessary for the execution of the job. The power Wj is determined from the type of the job (described below). In Step S505, the CPU 302 compares the power Wg acquired from the power mixing unit 108 with the power Wj estimated by the CPU 302 to determine whether the acquired power Wg is higher than or equal to the estimated power Wj. If the CPU 302 determines that the acquired power Wg is higher than or equal to the estimated power Wj, in Step S506, the CPU 302 selects the green power as the power supply source because the job is executable within the supply capacity of the green power. Then, the process goes to Step S508.

If the CPU 302 determines in Step S505 that the estimated power Wj is higher than the acquired power Wg, in Step S507, the CPU 302 selects the commercial power supply as the power supply source because the supply capacity of the green power is insufficient for the execution of the job. Then, the process goes to Step S508. In Step S508, the CPU 302 issues a command to use the selected power supply to the power mixing unit 108. Then, the process illustrated in FIG. 5 is terminated. The content of the commands issued by the CPU 302 will be described in detail below.

When the green power is selected in Step S506, a decrease in the amount of power generated by the power generating unit 109 during the execution of the job may cause the acquired power Wg to be lower than the estimated power Wj. In such a case, the mixing controller 406 adjusts the mixture ratio in the mixing circuit 405 so that the power from the commercial power supply is mixed by an amount corresponding to the value resulting from subtraction of the value of the output power meter 404 from the value of the mixing power meter 407. This allows the power to be stably supplied to the MFP 104.

FIG. 6 illustrates an exemplary amount-of-power table for every job, which is used in the power estimation and which is stored in the program memory 305 illustrated in FIG. 3. The table illustrated in the example in FIG. 6 is used by the CPU 302 to estimate the power necessary for the execution of the job input into the job processing apparatus in Step S504.

Referring to FIG. 6, reference numeral 601 denotes a column indicating the type of each job and reference numeral 602 denotes a column indicating the power consumption in each job type. For example, the power necessary for the execution of the copy job is 1,400 W.

FIG. 7 illustrates an example of the command to inquire about the available green power, which is issued by the CPU 302 illustrated in FIG. 3 to the power mixing unit 108.

Referring to FIG. 7, reference numeral 701 denotes a transmission source. A value of "1" indicates the MFP 104. Reference numeral 702 denotes a transmission destination of the command. A value of "2" indicates the power mixing unit 108. Reference numeral 703 denotes the content of the command. In this example, information about the power which can be supplied from the power mixing unit 108 to the MFP 104 is requested. Reference numeral 704 denotes specification of the power supply source. In this example, the value of the power Wg of the green power supplied from the power generating unit 109 is requested.

FIG. 8 illustrates an exemplary command to specify a power supply that is to be used for the power mixing unit 108 illustrated in FIG. 4.

Referring to FIG. 8, reference numeral 801 denotes a transmission source. A value of "1" indicates the MFP 104. Reference numeral 802 denotes a transmission destination of the command. A value of "2" indicates the power mixing unit 108. Reference numeral 803 denotes the content of the command. In this example, a power supply that is to be used is specified for the power mixing unit 108 by the MFP 104. Reference numeral 804 denotes specification of the power supply source. In this example, the green power supplied from the power generating unit 109 is specified.

As described above, in the first embodiment, the green power is used if the supply capacity of the green power is higher than or equal to the power necessary for the execution of a job that is input and the commercial power supply is used if the supply capacity of the green power is lower than the power necessary for the execution of the job.

Second Embodiment

An example is described in a second embodiment in which it is determined whether the power is switched on the basis of the power generated by the power generating unit 109, the amount of power accumulated in the secondary battery 402, the power necessary for the execution of a job, and the time required to execute the job.

Not only the power generated by the power generating unit 109 but also the power accumulated in the secondary battery 402 are used in the execution of a job in the second embodiment. This has the advantage that addition of the power discharged from the secondary battery 402 may allow the job to be executed even if the power output from the power generating unit 109 is insufficient for the power necessary for the execution of the job. However, the time required to execute the job is considered in order to prevent the power accumulated in the secondary battery 402 from being run out during the execution of the job.

The time during which the power can be supplied is varied with the power discharged from the secondary battery 402. An amount of job execution power Whj is calculated according to Equation (1) by using the power Wj necessary for the execution of the job and a job execution time Tj required to execute the job:

$$Whj = Wj \times Tj \qquad (1)$$

An amount of available green power Whg is calculated according to Equation (2) by using the power Wg that is generated and an amount of power Whb accumulated in the secondary battery 402:

$$Whg = Wg \times Tj + Whb \qquad (2)$$

The green power is selected because it is determined that the job is executable with the green power if the amount of available green power Whg is higher than or equal to the amount of job execution power Whj and the commercial power supply is selected if the amount of available green power Whg is lower than the amount of job execution power Whj.

The number of prints N is used to estimate the job execution time Tj. The number of prints N can be acquired from analysis of job data that is received in the print job and the FAX transmission job. The number of prints N can be acquired from multiplication of the number of copies specified by the user by the number of pages in the copy job. The job execution time Tj required for the printing by the acquired number of prints N is calculated according to Equation (3) by using a print speed V in the MFP 104:

$$Tj = V \times N \quad (3)$$

Figure 9:
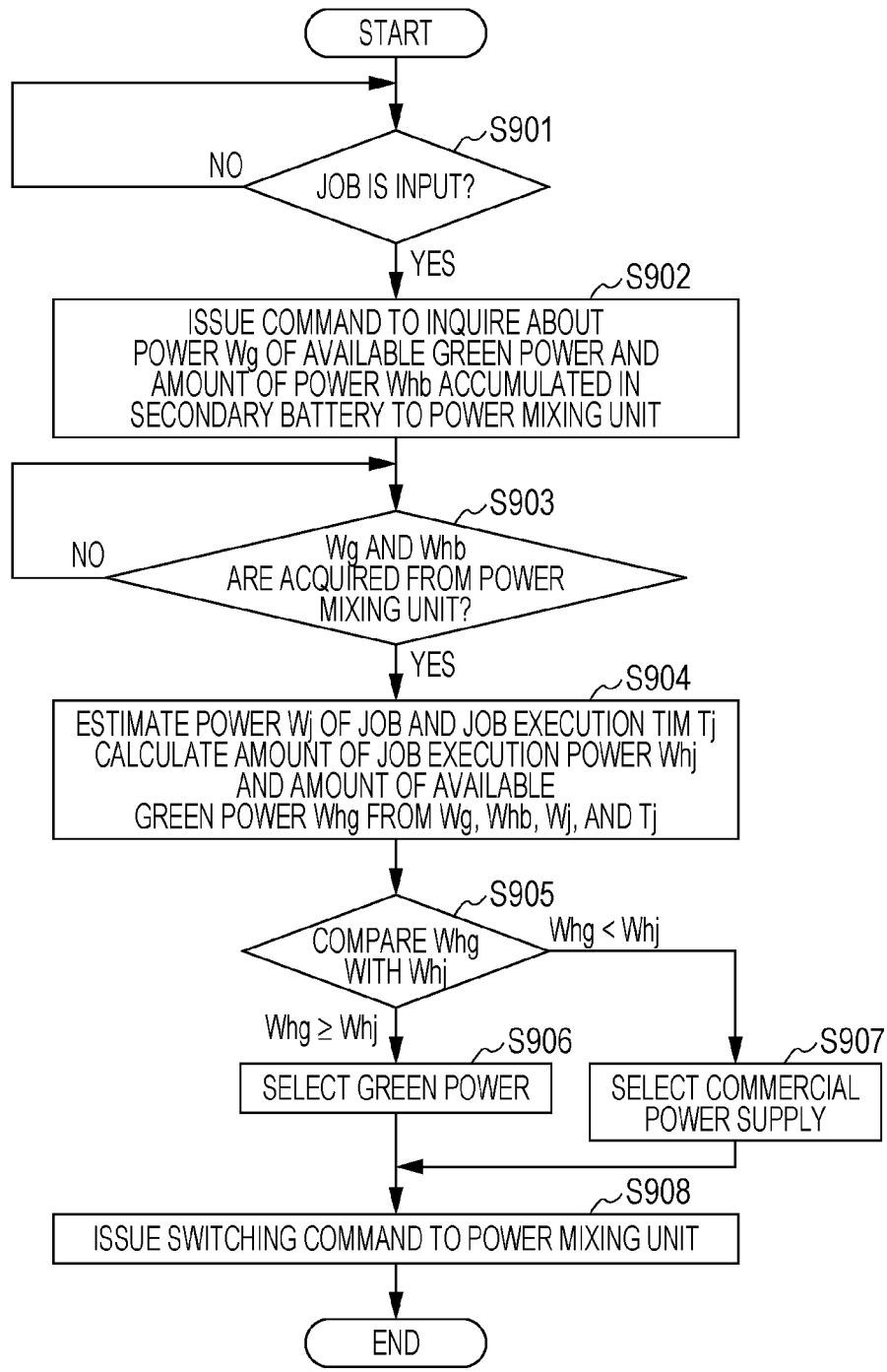
FIG. 9 is a flowchart illustrating a method of controlling a job processing apparatus according to a second embodiment.

FIG. 9 is a flowchart illustrating a method of controlling the job processing apparatus according to the second embodiment. An exemplary process performed by the CPU 302 in the control unit 202 when a job is input into the MFP 104 illustrated in FIG. 1 is illustrated in FIG. 9. Each step in the flowchart in FIG. 9 is realized by the CPU 302 that executes the control program stored in the program memory 305.

Referring to FIG. 9, in Step S901, the CPU 302 in the control unit 202 waits for input of a job. If a job is input, in Step S902, the CPU 302 transmits a command to inquire about the power Wg of the available green power and the amount of power Whb accumulated in the secondary battery 402 to the power mixing unit 108. In Step S903, the CPU 302 waits for a response from the power mixing unit 108 and determines whether the power Wg and the amount of power Whb are acquired from the power mixing unit 108. If the power Wg and the amount of power Whb are acquired from the power mixing unit 108 (YES in Step S903), in Step S904, the CPU 302 estimates the power Wj necessary for the execution of the job and the job execution time Tj. The table illustrated in FIG. 6 is used in the estimation of the power Wj, as in the first embodiment. The CPU 302 calculates the amount of job execution power Whj and the amount of available green power Whg from the values of the power Wj, the job execution time Tj, the power Wg, and the amount of power Whb by using Equations (1) and (2).

In Step S905, the CPU 302 compares the amount of available green power Whg with the amount of job execution power Whj. If the amount of available green power Whg is higher than or equal to the amount of job execution power Whj, in Step S906, the CPU 302 selects the green power because the job is executable within the supply capacity of the green power. Then, the process goes to Step S908. If the amount of job execution power Whj is higher than the amount of available green power Whg, in Step S907, the CPU 302 selects the commercial power supply because the supply capacity of the green power is insufficient for the execution of the job. Then, the process goes to Step S908. In Step S908, the CPU 302 issues the command to use the selected power supply to the power mixing unit 108. Then, the process illustrated in FIG. 9 is terminated.

As described above, in the second embodiment, the amount of power accumulated in the secondary battery 402 is also considered in the determination of whether the green power is used. Accordingly, it is possible to execute a job that requires power higher than the power supplied from the power generating unit 109.

Third Embodiment

An example is described in a third embodiment in which the type of the power supply that is selected depending on the type of a job, which is selected upon reception of the job, is displayed in the operation unit 201.

Since the power that is required is varied with the type of the job in the MFP 104, as described above, the user is capable of determining whether the green power is available for every job type.

Figure 10:
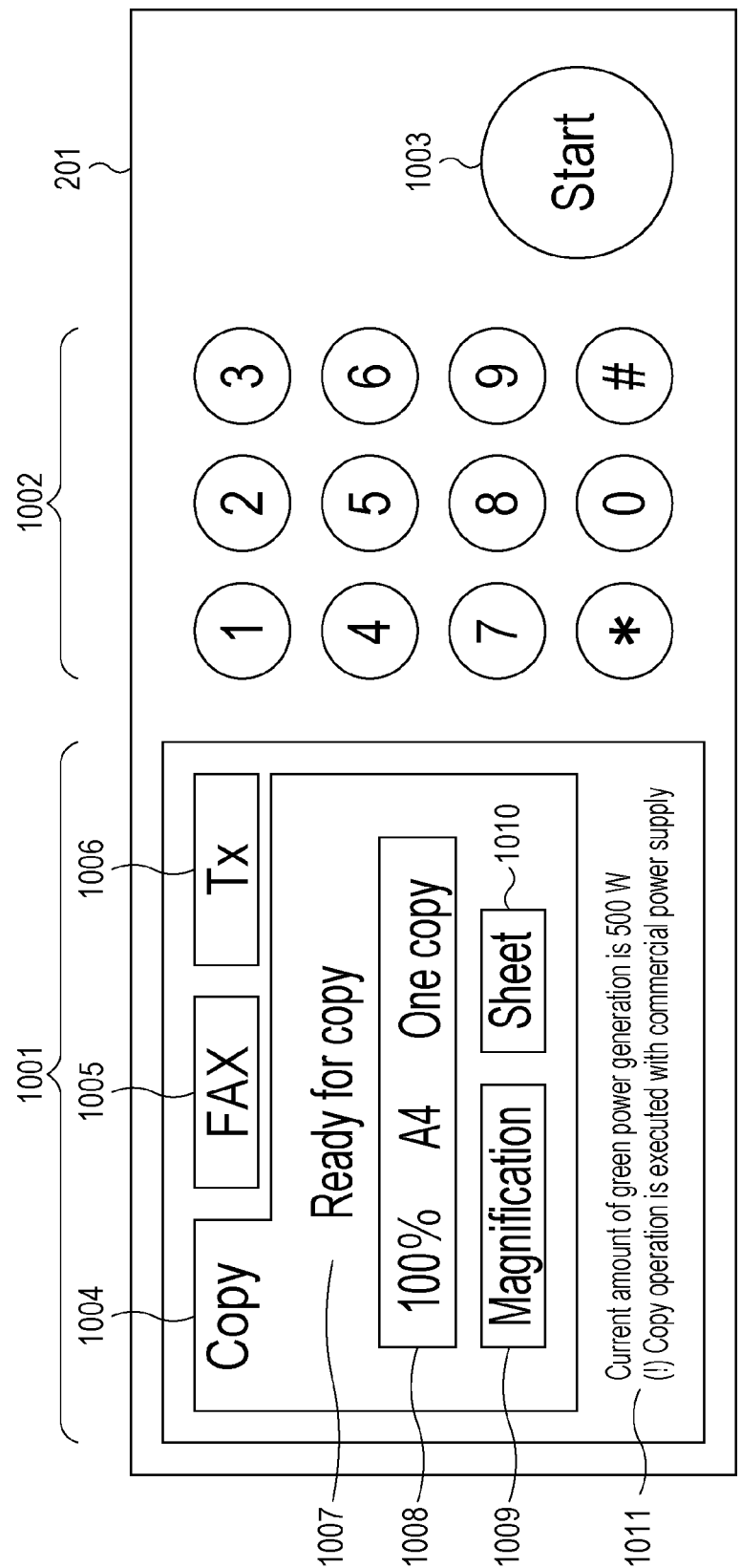
FIG. 10 is a plan view illustrating an exemplary external view of an operation unit illustrated in FIG. 2.

FIG. 10 is a plan view illustrating an exemplary external view of the operation unit 201 illustrated in FIG. 2.

Referring to FIG. 10, a touch panel display portion 1001 includes a transparent touch panel overlaid on a liquid crystal display. The touch panel display portion 1001 has a function to display an image generated by the CPU 302 and a function to detect a coordinate pressed by the user with the CPU 302. The content of display is composed of button images to provide the touch panel display portion 1001 with the button function. A numeric keypad 1002 and a Start button 1003 are push buttons and the CPU 302 detects any of the buttons pressed by the user. A copy function selection button 1004, a FAX function selection button 1005, and a transmission function selection button 1006 are provided in an upper part of the touch panel display portion 1001.

The copy function is selected in the example in FIG. 10. A status display field 1007 is a portion in which whether the job is executable is displayed. A job setting display field 1008 is a portion where the settings of the job are displayed. The user is capable of changing the settings by pressing a magnification change button 1009 and a sheet selection button 1010. A power supply status display field 1011 is a portion where the state of the green power and information indicating which power supply is used to execute the job are displayed.

Figure 11:
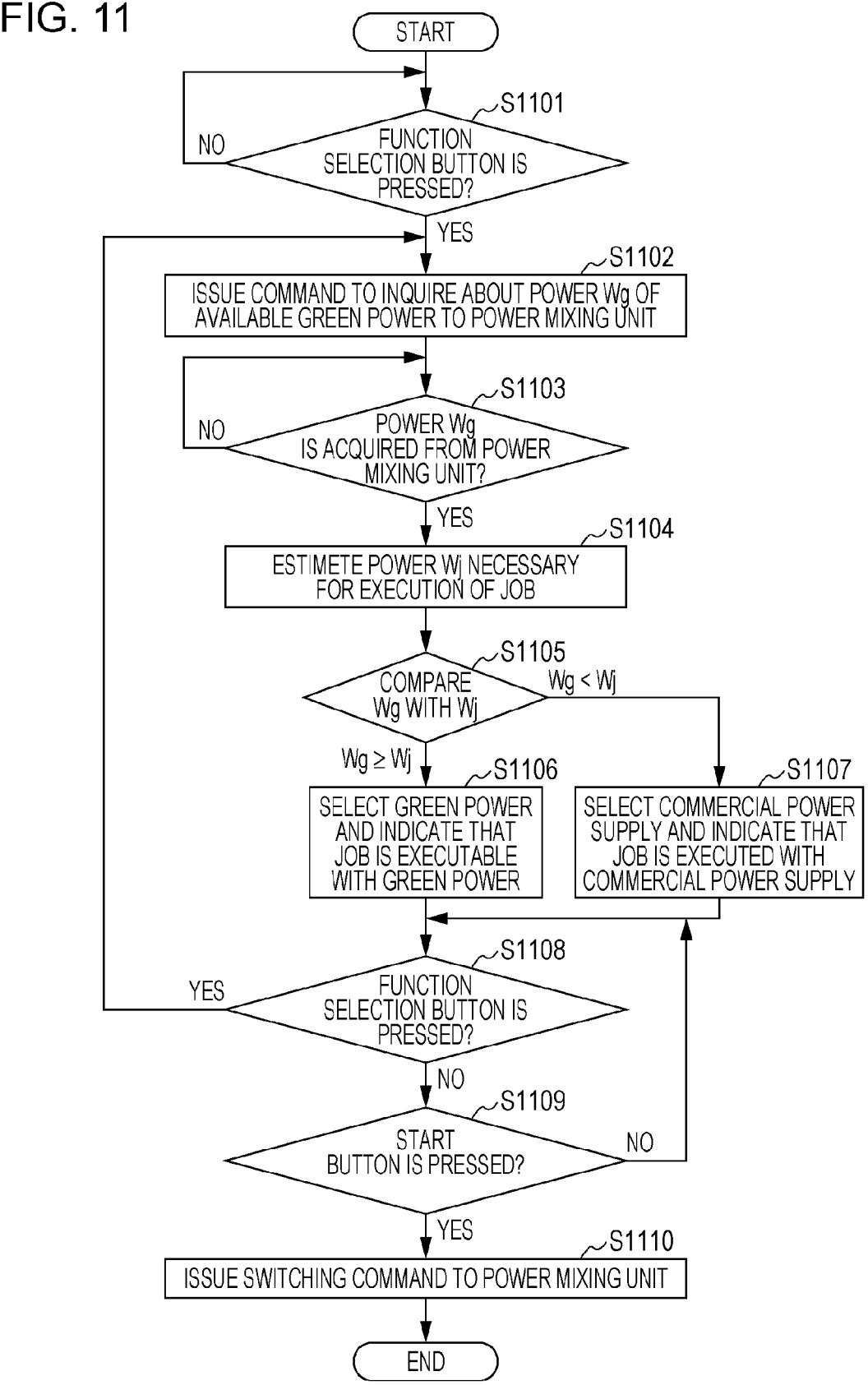
FIG. 11 is a flowchart illustrating a method of controlling a job processing apparatus according to a third embodiment.

FIG. 11 is a flowchart illustrating a method of controlling the job processing apparatus according to the third embodiment. An exemplary process performed by the CPU 302 in the control unit 202 when a job type is selected in the MFP 104 illustrated in FIG. 1 is illustrated in FIG. 11. Each step in the flowchart in FIG. 11 is realized by the CPU 302 that executes the control program stored in the program memory 305. A process of determining the content displayed in the power supply status display field 1011 will now be described.

Referring to FIG. 11, in Step S1101, the CPU 302 waits for pressing of any of the copy function selection button 1004, the FAX function selection button 1005, and the transmission function selection button 1006. If the CPU 302 determines that any of the function selection buttons is pressed (YES in Step S1101), in Step S1102, the CPU 302 transmits the command to inquire about the power Wg of the available green power to the power mixing unit 108.

In Step S1103, the CPU 302 waits for a response from the power mixing unit 108 and determines whether the power Wg is acquired from the power mixing unit 108. If the power Wg is acquired from the power mixing unit 108 (YES in Step S1103), in Step S1104, the CPU 302 estimates the power Wj necessary for the execution of the job. The power Wj is determined from the job type selected in the same manner as in the first embodiment.

In Step S1105, the CPU 302 compares the acquired power Wg with the estimated power Wj. If the CPU 302 determines that the acquired power Wg is higher than or equal to the estimated power Wj, in Step S1106, the CPU 302 selects the green power and indicates that the job is executable with the green power in the power supply status display field 1011 because the job is executable within the supply capacity of the green power.

If the CPU 302 determines that the estimated power Wj is higher than the acquired power Wg, in Step S1107, the CPU 302 selects the commercial power supply and indicates that the job is executed with the commercial power supply in the power supply status display field 1011 because the supply capacity of the green power is insufficient for the execution of the job.

In Step S1108, the CPU 302 determines whether any of the function selection buttons is pressed. If the CPU 302 determines that any of the function selection buttons is pressed (YES in Step S1108), the process goes back to Step S1102 because another function is selected. If the CPU 302 determines that any of the function selection buttons is not pressed (NO in Step S1108), in Step S1109, the CPU 302 determines whether the Start button 1003 is pressed. If the CPU 302 determines that the Start button 1003 is not pressed (NO in Step S1109), the process goes back to Step S1108.

If the CPU 302 determines that the Start button 1003 is pressed (YES in Step S1109), this means that the user has determined to start the job. In Step S1110, the CPU 302 issues the command to use the selected power supply to the power mixing unit 108. Then, the process illustrated in FIG. 11 is terminated. Then, the job is processed.

As described above, in the third embodiment, whether the job is executable with the green power for each job type is displayed in the operation unit 201 to notify the user of whether the job is executable with the green power. The provision of the significant information to the user who wants to use the green power allows the user to change the job type, if necessary, or to defer the execution of the job.

Fourth Embodiment

In a fourth embodiment, an example is described in which the power supply with which a job has been executed is checked upon completion of the job to record the used power supply in a history.

As described above in the first embodiment, the green power may run short during the execution of a job and the mixing controller 406 may switch the power supply to the commercial power supply. In consideration of this, the CPU 302 inquires of the mixing controller 406 about information about the power supply used in the execution of the job after the job is executed in the fourth embodiment.

Figure 12:
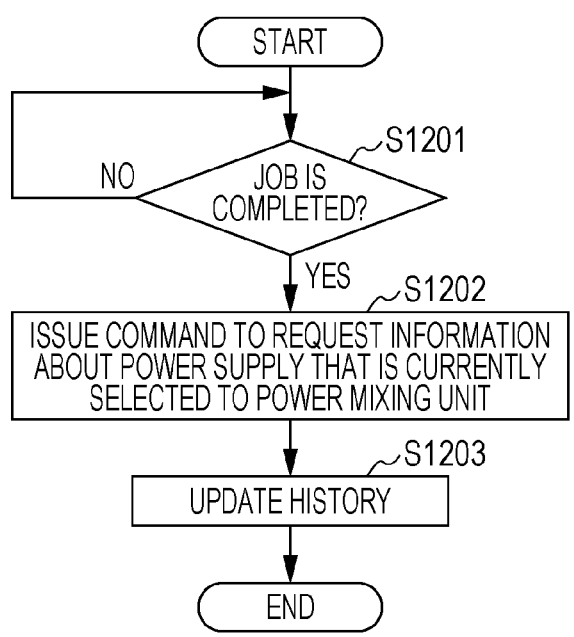
FIG. 12 is a flowchart illustrating a method of controlling a job processing apparatus according to a fourth embodiment.

FIG. 12 is a flowchart illustrating a method of controlling the job processing apparatus according to the fourth embodiment. An exemplary process in which the CPU 302 in the MFP 104 illustrated in FIG. 1 creates a history upon completion of a job is illustrated in FIG. 12. Each step in the flowchart in FIG. 12 is realized by the CPU 302 that executes the control program stored in the program memory 305. A process of determining the content displayed in the power supply status display field 1011 will now be described.

Referring to FIG. 12, in Step S1201, the CPU 302 waits for completion of the job. If the job is completed (YES in Step S1201), in Step S1202, the CPU 302 issues a command to request information about the power supply that is currently selected to the power mixing unit 108. In Step S1203, the CPU 302 updates a command transmission history managed by a non-volatile memory (not illustrated). Then, the process illustrated in FIG. 12 is terminated.

FIG. 13 illustrates an exemplary command managed by the CPU 302 illustrated in FIG. 3. An exemplary command to request information about the power supply that is currently selected is illustrated in FIG. 13.

Referring to FIG. 13, reference numeral 1301 denotes a transmission source. A value of "1" indicates the MFP 104. Reference numeral 1302 denotes a transmission destination of the command. A value of "2" indicates the power mixing unit 108. Reference numeral 1303 denotes the content of the command. In this example, a request for information about the power supply that is currently selected is issued to the power mixing unit 108 by the CPU 302.

FIG. 14 illustrates an exemplary history table of the power supply types that are selected in association with the jobs and that are managed by the CPU 302 illustrated in FIG. 3. In this example, the state of the power that is used is managed as a power history to charge different rates to different power supply sources.

Referring to FIG. 14, reference numeral 1401 denotes a serial number uniquely given to each job. Reference numeral 1402 denotes the job type. Reference numeral 1403 denotes a time at which the job is processed. Reference numeral 1404 denotes information about the power supply type used during the execution of the job.

As described above in the fourth embodiment, even if the amount of power generation in the power generating unit 109 is decreased during the processing of the job to switch the power supply to the commercial power supply, the acquisition of the information about the power that is actually used upon completion of the job allows the accurate history to be recorded. This is effective in, for example, a case in which the rate is varied depending on the power supply that is used.

Fifth Embodiment

In a fifth embodiment, whether a job that is being executed is not completed within the power supply capacity of the first power supply is detected in the first embodiment or the second embodiment to switch the power supply source depending on the result of the detection.

Specifically, how the power supply capacity of the first power supply is varied is monitored during the execution of a job received from the first power supply, which is the power supply source. If it is detected that the monitored power supply capacity of the first power supply is insufficient for the completion of the job that is being executed, the CPU 302 switches the power supply source from the first power supply to the second power supply.

Accordingly, even if the power supply capacity corresponding to the first power supply is varied, the power control is switched to the use of the second power supply to reliably complete the job that is requested.

The steps in the embodiments of the present invention may be realized by software (programs) acquired via a network or various storage media, which is executed by a processing apparatus (a CPU or a processor), such as a personal computer (a computer).

While the invention is described in terms of some specific examples and embodiments, it will be clear that this invention is not limited to these specific examples and embodiments and that many changes and modified embodiments (including organic combinations of the embodiments) will be obvious to those skilled in the art without departing from the true spirit and scope of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-267894, filed Dec. 7, 2012, which is hereby incorporated by reference herein in its entirety.

What is claimed is:

1. A job processing apparatus that performs job processing by using power supplied from a first power supply and a second power supply, the job processing apparatus comprising:
   a receiving unit configured to receive a job;
   a calculating unit configured to calculate an amount of power consumed to process the received job;
   a determining unit configured to determine whether the received job is executable based on a first amount of power that can be supplied from the first power supply and the calculated amount of power;
   a control unit configured to perform control so that the job is processed with the power supplied from the first power supply if the determining unit determines that the job is executable with the first amount of power and the job is processed with the power supplied from the second power supply if the determining unit determines that the job is not executable with the first amount of power;
   a storage unit configured to store a power history in which each executed job is associated with a type of the power supply that is used; and
   a charging unit configured to charge each job in accordance with the type of the power supply associated with the job stored in the storage unit.

2. The job processing apparatus according to claim 1, wherein the second power supply is different in power supply source type from the first power supply.

3. The job processing apparatus according to claim 1, wherein the first power supply supplies power generated with renewable energy.

4. The job processing apparatus according to claim 1, wherein the second power supply is alternating current power supply.

5. The job processing apparatus according to claim 1, wherein the determining unit determines whether the received job is executable with the first amount of power that can be supplied from the first power supply and the calculated amount of power based on a type of the received job and a power state of the first power supply.

6. The job processing apparatus according to claim 1, further comprising an accumulating unit configured to accumulate the power supplied from the first power supply.

7. The job processing apparatus according to claim 6, wherein the determining unit determines whether the received job is executable based on a power state of the first power supply and a state of the power accumulated in the accumulating unit.

8. The job processing apparatus according to claim 1, further comprising:
   an instructing unit configured to instruct a type of a job to be executed; and
   an indicating unit configured to indicate whether the job, the type of which is instructed, is executable with the power supplied from the first power supply for every job type that is instructed.

9. The job processing apparatus according to claim 1, further comprising:
   a monitoring unit configured to monitor how a power supply capacity of the first power supply is varied during the execution of the job supplied from the first power supply, which is a power supply source; and
   a detecting unit configured to detect whether the monitored power supply capacity of the first power supply is insufficient for completion of the job that is being executed,
   wherein, if it is detected that the power supply capacity of the first power supply is insufficient for completion of the job that is being executed, the control unit switches the power supply source from the first power supply to the second power supply.

10. A method of controlling a job processing apparatus that performs job processing by using power supplied from a first power supply and a second power supply, the method comprising:
    receiving a job;
    calculating an amount of power consumed to process the received job;
    determining whether the received job is executable based on a first amount of power that can be supplied from the first power supply and the calculated amount of power;
    performing control so that the job is processed with the power supplied from the first power supply if it is determined that the job is executable with the first amount of power and the job is processed with the power supplied from the second power supply if it is determined that the job is not executable with the first amount of power;
    storing, in a storage unit, a power history in which each executed job is associated with a type of the power supply that is used; and
    charging each job in accordance with the type of the power supply associated with the job stored in the storage unit.

11. The method according to claim 10, wherein the second power supply is different in power supply source type from the first power supply.

12. The method according to claim 10, wherein the first power supply supplies power generated with renewable energy.

13. The method according to claim 10, wherein the second power supply is alternating current power supply.

14. The method according to claim 10, wherein determining includes determining whether the received job is executable with the first amount of power that can be supplied from the first power supply and the calculated amount of power based on a type of the received job and a power state of the first power supply.

15. The method according to claim 10, further comprising accumulating the power supplied from the first power supply.

16. The method according to claim 15, wherein determining includes determining whether the received job is executable based on a power state of the first power supply and a state of the power accumulated in the accumulating.

17. The method according to claim 10, further comprising:
- instructing a type of a job to be executed; and
- indicating whether the job, the type of which is instructed, is executable with the power supplied from the first power supply for every job type that is instructed.

18. The method according to claim 10, further comprising:
- monitoring how a power supply capacity of the first power supply is varied during the execution of the job supplied from the first power supply, which is a power supply source; and
- detecting whether the monitored power supply capacity of the first power supply is insufficient for completion of the job that is being executed,
- wherein, if it is detected that the power supply capacity of the first power supply is insufficient for completion of the job that is being executed, performing control includes switching the power supply source from the first power supply to the second power supply.

\* \* \* \* \*